Patented Dec. 20, 1949

2,491,833

UNITED STATES PATENT OFFICE 2,491,833

HYDROCARBON-SUBSTITUTED SILYL METHANE COMPOUNDS

Robert O. Sauer, Schenectady, N. Y., assignor to General Electric Company, a corporation of New York No Drawing. Application January 22, 1948, Serial No. 3,836

4 Claims. (Cl. 260—448.2)

This invention is concerned with novel compounds of silicon. More particularly, the invention relates to new hydrocarbon-substituted silyl methane compounds corresponding to the general formula

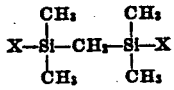

where X is the same and is a member selected from the class consisting of halogens and the hydroxyl radical. Examples of halogens, which X in the above formula may be are, for instance, chlorine, fluorine, bromine, etc.

The compounds of this invention have utility as intermediates in the preparation of other chemical compounds or polymers. They are particularly useful in the preparation of higher molecular weight liquid polymeric materials which may be used for lubricating purposes. These latter higher molecular weight liquid compositions may be further modified with hydrocarbon-substituted polysiloxanes in the presence of suitable agents to yield elastic or resinous products. The products of hydrolysis of the aforementioned halogeno derivatives are useful for preventing flotation of pigment in pigmented resinous coating compositions as is disclosed and claimed in Sage application, Serial No. 794,443, filed December 29, 1947, and assigned to the same assignee as the present invention.

Various methods may be employed for preparing the claimed novel compositions of matter. One method for preparing the claimed halogen-terminated silyl methanes comprises heating under pressure at elevated temperatures a trimethylhalogenosilane in the presence of a Friedel-Crafts type catalyst, for instance, aluminum chloride. The particular trimethylhalogenosilane employed will depend on the specific terminal halogen desired to be present on each silicon atom in the silyl methane compound. By fractional distillation it is possible to isolate the desired compound. Another method for making the halogen-terminated silyl methanes is found in Example 2 below.

The hydroxy-terminated silyl methane which may be prepared by carefully hydrolyzing the halogen-substituted silyl methane obtained in accordance with the foregoing general directions, are useful as an anti-foaming agent for aqueous solutions.

In order that those skilled in the art may better understand how the claimed compositions of matter may be prepared, the following examples are given by way of illustration.

Example 1

To an Aminco steel hydrogenation bomb was charged 855 grams trimethylchlorosilane and about 23 grams anhydrous aluminum chloride. The bomb was closed and the mixture heated at 375° C. and 1200 p. s. i. for 7 hours. After cooling the bomb, the liquid contents were fractionally distilled to yield a fraction comprising essentially pure bis-(dimethylchlorosilyl) methane boiling at about 176–177° C. at 754 mm. Analysis of the compound showed it to contain 35.55 per cent chlorine (calculated 35.25 per cent). This compound has the following properties:

$n_D^{20}$ 1.4480
$d_4^{20}$ 1.016
Molar refractivity 53.01 (calculated 53.10)

Example 2

Into a 1-liter, 3-necked flask equipped with a stirrer, dropping funnel, and double condenser were placed 23 grams magnesium, 50 cc. dry ether, a crystal of iodine, and a few drops of ethyl iodide. A solution of 179 grams monochloromethyl pentamethyldisiloxane (prepared in accordance with the directions given by Krieble et al in J. A. C. S. 67, 1810) in 300 cc. dry ether was then added slowly to the magnesium mixture over a 2-hour period. The mixture was then heated under reflux for 30 minutes to complete the formation of the Grignard reagent corresponding to the formula $(CH_3)_3SiOSi(CH_3)_2CH_2MgCl$. This Grignard reagent was then added during a 1½ hour period to a solution of 242 cc. (2.0 mols) of dimethyldichlorosilane in 250 cc. dry ether and the mixture heated under reflux for about 15 minutes. The total reaction mass was then poured carefully over cracked ice and water, the ether layer removed, and all volatile material boiling up to 110° C. was removed by distillation leaving behind 200 grams of a liquid mixture of complex methylsiloxanes comprising

$[(CH_3)_3SiOSi(CH_3)_2CH_2Si(CH_3)_2]_2O$

About 100 grams of the above-prepared liquid mixture of complex siloxanes was added slowly to 500 cc. concentrated sulfuric acid to give a homogeneous solution. After cooling the solution, 117 grams (1.5 mols) calcium fluoride was added slowly to the acid solution. The organic material was extracted with 200 cc. n-pentane, and the mixture was fractionally distilled through a Vigreux column to yield about 43 grams bis- (fluorodimethylsilyl)methane having a boiling point of 114–116° C. at atmospheric pressure. This compound had the following properties:

$n_D^{20}$ 1.3780
$d_4^{20}$ 0.920
Molar refractivity 42.2 (calculated 42.7)

Analysis of the compound showed it to contain 22.1 per cent fluorine (calculated 22.6).

*Example 3*

To prepare the bis-(hydroxydimethylsilyl) methane, 15 grams of bis-(fluorodimethylsilyl) methane was added to dilute, aqueous sodium hydroxide in an amount in excess of that required to neutralize the hydrogen fluoride formed as a result of the hydrolysis action of the water. Both a solid and a liquid resulted from this hydrolysis. Filtration of the mixture yielded 7 grams of a solid which upon recrystallization from benzene was shown to have a melting point of 84–86° C. This compound on analysis was proved to be pure bis-(hydroxydimethylsilyl) methane as evidenced by the following results:

|  | Found | Calculated |
|---|---|---|
| Per cent carbon | 36.75 | 36.55 |
| Per cent hydrogen | 9.70 | 9.81 |

It will be apparent to those skilled in the art that the other compounds embraced by the formula disclosed in the first paragraph of the description of the invention, for example, bis-(bromodimethylsilyl) methane, etc., may be prepared using the method described in either Examples 1 or 2.

What I claim as new and desire to secure by Letters Patent of the United States is:

1. Chemical compounds corresponding to the general formula

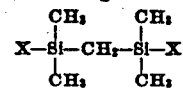

where X is the same and is a member selected from the class consisting of halogens and the hydroxyl radical.

2. Bis - (dimethylchlorosilyl) methane corresponding to the formula

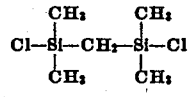

3. Bis - (dimethylfluorosilyl) methane corresponding to the formula

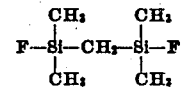

4. Bis - (dimethylhydroxysilyl) methane corresponding to the formula

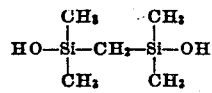

ROBERT O. SAUER.

REFERENCES CITED

The following references are of record in the file of this patent:

UNITED STATES PATENTS

| Number | Name | Date |
|---|---|---|
| 2,381,000 | Patnode | Aug. 7, 1945 |

OTHER REFERENCES

Goodwin "J. A. C. S.," vol. 69 (1947), page 2247.
Sommer "J. A. C. S.," vol. 69 (1947), page 980.